Oct. 13, 1936.	G. EGLOFF ET AL	2,057,424
TREATMENT OF HYDROCARBON OILS
Original Filed May 18, 1931

Inventors
Gustav Egloff and
Jacque C. Morrell.
By Frank L. Belknap
Atty

Patented Oct. 13, 1936

2,057,424

UNITED STATES PATENT OFFICE 2,057,424

TREATMENT OF HYDROCARBON OILS

Gustav Egloff and Jacque C. Morrell, Chicago, Ill., assignors, by mesne assignments, to Universal Oil Products Company, Chicago, Ill., a corporation of Delaware Application May 18, 1931, Serial No. 538,028

6 Claims. (Cl. 196—36)

This invention relates to the treatment of hydrocarbon oils and refers more particularly to the treatment of the low boiling products produced in cracking hydrocarbon oils as well as to the treatment of the lower boiling portions of crude petroleums and other hydrocarbon mixtures.

More specifically the invention has reference to processes involving the chemical treatment of the vapors of such light hydrocarbons by improved methods which refine the vapors prior to their condensation so that the condensed liquids require no redistillation and a minimum of further treatment.

In one specific embodiment the invention comprises treating hydrocarbon oil vapors with hydrochloric acid and solutions of salts of mercury in the presence of solid contact substances which exert catalytic, polymerizing or chemical influences upon the course of the reactions.

Salts of mercury adaptable for use in the present invention are preferably of the more soluble types such as, for example, the chloride, the bromide, the nitrate, the acetate, etc., though in some instances as will be later more fully described, some of the less soluble salts may be employed in admixture with the more soluble to produce particular treating effects, e. g., the less soluble salts of mercury are rendered more soluble by dissolving in solution of chlorides of sodium, potassium or ammonium.

There may at times be present in the solutions of mercury salts used minor amounts of salts of other metals which have a more or less determining effect upon the course of the reactions involved which will be also more fully described later.

As examples of solid contact materials which may be employed in combination with hydrochloric acid and metallic salt solutions may be mentioned such materials as clays, fuller's earth, bentonite, bauxite, certain types of the zeolites such as greensand or glauconite, silica gel, etc., these substances containing at times minor amounts of finely divided metals or their oxides. At times it may be also desirable to employ the metals or metal oxides as principal constituents of the contact masses, and the beds of material through which the oil vapors pass during treatment may be uniform throughout the mass or grade into strata of variable composition. As a further means of securing effective contact materials may at times be supported upon superimposed trays.

Figure 1:
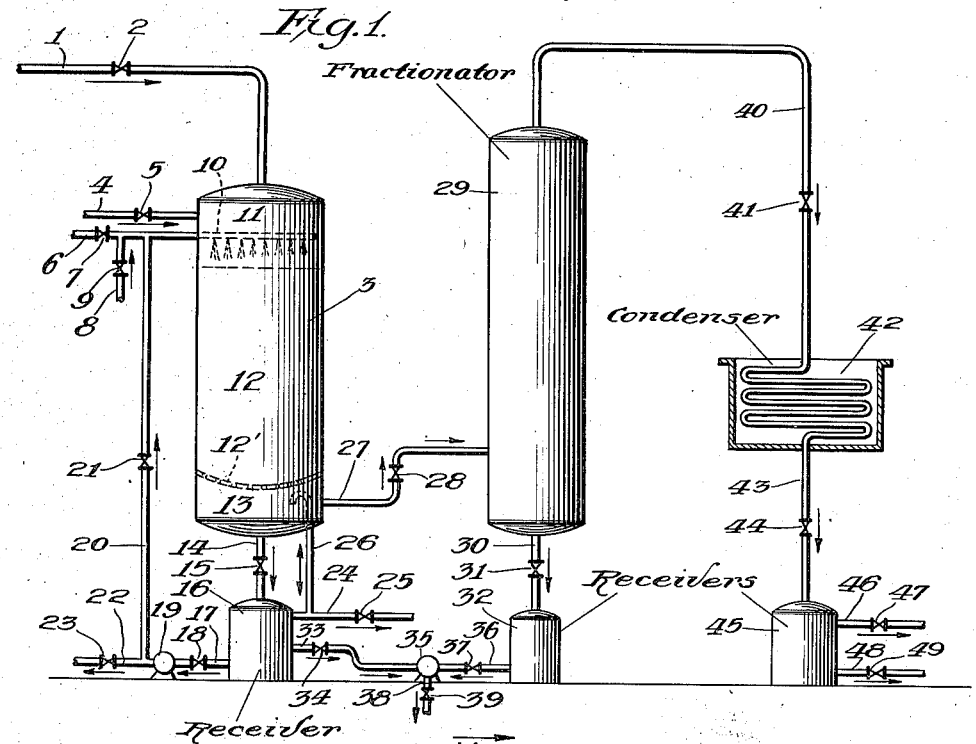
Figure 2:
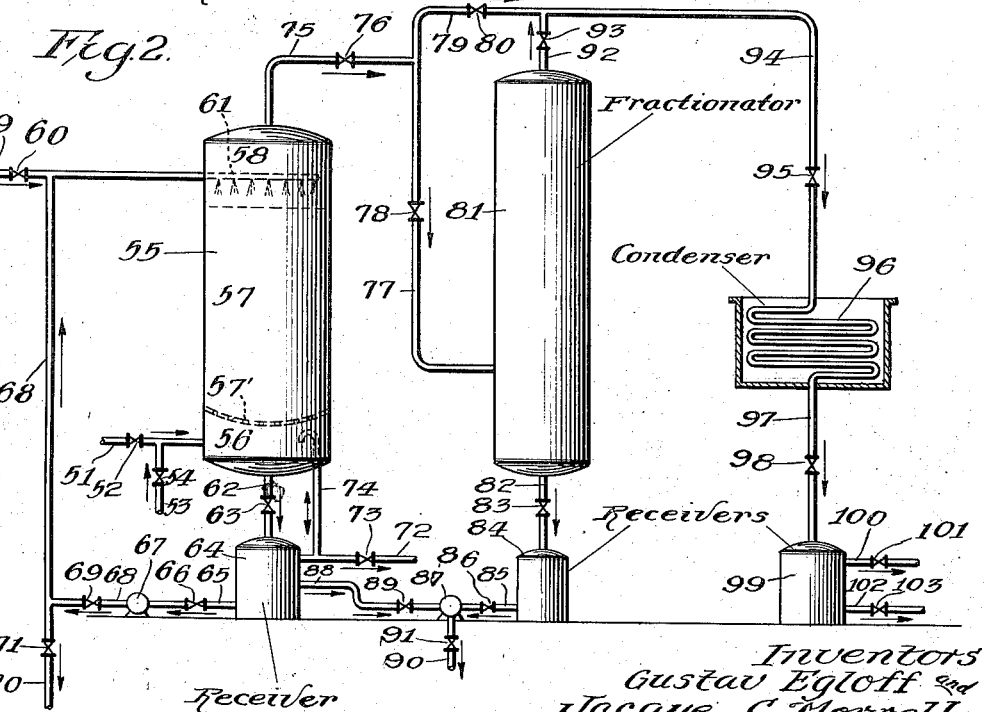

To assist in describing operations typical of the process of the present invention, the attached diagrammatic drawings have been provided which represent arrangements of equipment in which operations may be conducted, Figure 1 representing a layout adaptable to use when the oil vapors pass downwardly with the treating reagents through the contact mass, and Figure 2 a layout which may be used when best results are obtained with passage of the oil vapors mixed with hydrochloric acid upwardly through the contact masses counterflow to the metallic salt solutions.

Referring to Figure 1, line 1 containing a control valve 2 may represent a supply line for hydrocarbon oil vapors to be treated which may come from any oil refining process in which relatively low boiling hydrocarbon vapors are regenerated such as a primary distillation or a cracking process, such vapors with or without substantial pressure reduction being admitted to the upper section 11 of a treater 3 which contains a suitable bed of solid contact materials 12 supported upon a perforated false bottom 12' which separates the solid materials from a lower space 13. Hydrochloric acid either in aqueous solution or as a gas may be introduced into the oil vapors through a line 4 containing control valve 5 into vapor space 11, and line 6 containing valve 7 and terminating in a spray or other distributing means 10 may be used as a source of supply for the mercury salt solutions which may be pumped in by means not shown at a rate consistent with the production of desired treating effects. Branch line 8 containing a valve 9 may serve for the admission of other metallic salt solutions such as, for example, solutions of zinc chloride and a line 20 containing control valve 21 permits the recirculation of partially spent solutions as will be presently more fully described.

The reactions occurring during the passage of oil vapors, hydrochloric acid and various salt solutions through the types of contact solids mentioned are of a complicated nature which vary markedly in degree depending upon numerous chemical and physical factors such as, for example, the composition of the entering oil vapors, the amount of hydrochloric acid used, the particular salts used in solution and the concentration thereof and the nature of the contact mass. However, the effect of this type of treatment upon oil vapors produces very definite results in controllable reduction of unsaturation due to olefinic content particularly of compounds of diolefinic or more highly unsaturated character and reduction in sulphur content, a considerable portion of the sulphur in the oil vapors being eliminated as hydrogen sulphide and other portions being removed in heavy polymerized bodies formed.

The treated vapors along with reaction products and spent or partially spent salt solutions fall into lower chamber 13 wherein separation of vapors and liquids is effected. Liquids which include the salt solutions and heavy hydrocarbon reaction products substantially immiscible therewith may pass together through a line 14 controlled by a valve 15 to a separator 16, cooling being effected if further advisable by passing through intermediate cooling coils not shown in the drawing. In separator 16 partially spent salt solutions may separate as a lower layer and in case they still retain some virtue as treating reagents may be taken by a circulating pump 19 through a line 17 containing control valve 18 and discharged back into the stream of incoming vapors by way of line 20 containing control valve 21 and line 7 as already mentioned. If it be found that the solutions are ineffective for further treatment, they may be discharged through a line 22 containing a valve 23 for suitable disposal or the regeneration of active constituents. Liquid hydrocarbon products such as heavy polymerized oils which may appear as a layer above the aqueous layer may be taken from the separator through a line 33 containing a valve 34 to a pump 35 which discharges into a line 38 containing a control valve 39, which line may lead to a suitable point of disposal or use for these products, or may return them, for example, to a suitable point in a cracking unit from which the original oil vapors may have come so that they are further converted to produce increased yields of light desirable products, gases separating in separator 16 which may contain hydrochloric acid and low boiling chlorine derivatives of hydrocarbons may be withdrawn from the system to any point desired to a line 24 at a rate controlled by valve 25. The hydrochloric acid may be recovered by water absorption if such recovery is economical or it may be neutralized if such is not the case by such substances as caustic soda or ammonia. Line 26 is shown leading from the gas line 24 back into the separating chamber 13 of treater 3 to permit vapor connection therewith and prevent gas lock which might interfere with the free passage of liquids through line 14 to the separator 16.

Vapors from chamber 13 in the bottom of treater 3 may be conducted through a line 27 controlled by a valve 28 with or without further pressure reduction to a final fractionator 29, which is capable of producing low boiling hydrocarbon fractions of the range necessary for gasoline. Refluxes from this fractionator may pass through a line 30 controlled by a valve 31 to a receiver 32 which is also in liquid connection with pump 35 through line 36 containing valve 37 so that these refluxes may be disposed of jointly with the liquid separated in the bottom of the treater. These refluxes may also be subjected to intermediate cooling by means not shown as in the case of those from the treater.

Vapors of desired boiling point range along with incondensable gases may pass from fractionator 29 through a vapor line 40 controlled by a valve 41 and be cooled during passage through a condenser 42, the cooled products passing through a line 43 controlled by a valve 44 to a receiver and separator 45 which has a gas release line 46 containing control valve 47 and liquid draw line 48 containing control valve 49 which may be utilized for disposing of treated liquids. To assist in controlling the boiling point of vapors emergent from fractionator 29 a suitable amount of these liquids may be returned from receiver 45 to the top of the fractionator by equipment not shown. To keep down corrosion effects in the fractionating, condensing and collecting equipment ammonia or neutralizing materials may be introduced to the system at any point following the treater, the exact amounts necessary and the best point of introduction being determined by trial.

Referring to Figure 2, a slightly altered type of equipment is shown in which the treatment of the oil vapors is conducted generally counterflow to the salt solutions. In this drawing line 51 containing valve 52 indicates the line and valve through which hydrocarbon vapors may be admitted to the process similarly to those admitted in the preceding figure, such vapors entering lower compartment 56 of treater 55 and passing up through a solid contact mass 57 supported upon a perforated false bottom 57'. Hydrochloric acid may be admitted to the vapors through a line 53 containing control valve 54. The salt solutions may be admitted to vapor space 58 above the contact mass in the treater from a line 59 containing a valve 60, this line terminating in a spray or other atomizing means 61.

The essential differences between this type of treatment counterflow to the salt solutions and the concurrent treatment described in connection with Figure 1 are that first, the rising vapors undergo a partial fractionation and second, that the chemical treatment may be at times more effective due to the counterflow action. However, since both types of flow are adaptable in different cases, it is not intended to confine the invention to either case. As before, in connection with Figure 1, heavy hydrocarbon liquids and reaction products and spent or partially spent treating solutions may accumulate in lower chamber 56, these passing through a line 62 containing a valve 63 to a separator 64 in which the same general types of separation and segregation occur as in separator 16 of Figure 1. As before, spent or partially spent salt solutions may be removed through a line 65 containing control valve 66 and pumped by a pump 67 through a line 68 containing a valve 69 either back to the primary spray line 59 or disposed of outside the process through a line 70 containing a valve 71. The liquid layer of hydrocarbons and reaction products may be taken from above the aqueous layer through a line 88 containing a valve 89 and discharged by a pump 87 through a line 90 containing a valve 91 to the heating zone of a conversion process or to storage. Gases from the separator may be released through a line 72 containing a valve 73, and gas lock may be prevented as before by the provision of a line 74 connecting the vapor spaces.

Vapors from treater 55 may pass through a line 75 containing a valve 76 and in case further fractionation is necessary to obtain low boiling liquids of desired boiling point range, they may be passed through a line 77 controlled by a valve 78 to a final fractionator 81. Heavy refluxes may be withdrawn through a line 82 containing a valve 83 to a receiver 84 whence they are admitted to pump 87 through a line 85 controlled by a valve 86 and disposed of along with the hydrocarbon liquids from separator 64. Fixed gases and vapors of desired boiling point range may leave the top of fractionator 81 through a line 92 controlled by a valve 93 and by way of line 94 containing a valve 95 to a condenser 96 from whence the cooled products pass through a line 97 controlled by a valve 98 to a receiver 99, this receiver having the usual gas vent line 100 controlled by a valve 101 and a liquid draw line 102 controlled by valve 103 for finished products. Portions of the finished liquids may be returned to the top of fractionator to control the fractionation therein by means of lines and pumps not shown in the present drawing.

When sufficient fractionation has been effected during the passage of the oil vapors upwardly through treater 55 the fractionator 81 may be by-passed, the vapors from line 75 being conducted through a line 79 containing a control valve 80 directly to line 94 and thence to the condensing and collecting equipment as already described.

As examples of operations comprised within the scope of the invention many cases might be cited but it will suffice to give three typical treatments of vapors of cracked gasolines produced when operating upon charging oils from the Pennsylvania, California and Texas fields.

In the case of the Pennsylvania stock, vapors may be passed upwardly through a tower containing a finely divided clay countercurrent to a saturated solution of mercuric chloride containing a small amount of zinc chloride, the oil vapors being mixed with hydrochloric acid at the rate of 1 pound of concentrated or 37% hydrochloric acid per barrel of distillate and a small amount of steam and air. The condensed distillate from this treatment may have a water white color of 30 Saybolt, a gum content of from 15 to 25 mgs., by the copper dish method whereas the distillates produce without treatment may have a gum content as high as 300 mgs., and will be yellow to brown in color.

By a similar operation upon vapors of gasoline boiling point range produced in the cracking of a California gas oil, the amount of hydrochloric acid being increased to 1½ pounds per barrel, the treatment may reduce the gum content from 400 mgs. to 20 mgs. and at the same time reduce the sulphur content from 0.3% to 0.1%, the gasoline being sweet to the doctor test and having good color and color stability.

Cracking operations upon a residuum from the Refugio field of East Texas may produce a gasoline containing as high as 900 mgs. of gum per 100 cc. and sulphur as high as 0.4%. By treating the vapors of such a distillate by the process of the invention using hydrochloric acid at the rate of 2 pounds per barrel and operating in the general manner described in the two preceding examples, the gum content may be reduced to 50 mgs. and the sulphur content to approximately 0.1%, while the color will be 30 plus on the Saybolt scale.

The foregoing general description and examples of results obtainable by the process of the invention will serve to indicate the advantages thereof, but since the invention is broad in scope and may be operated in many other ways than the ones disclosed, the description and examples are not to be taken in a limiting sense.

We claim as our invention:

1. A process for refining cracked distillate which comprises treating vapors thereof with added hydrochloric acid in the presence of a solution containing dissolved mercuric chloride and zinc chloride.

2. A process for refining cracked distillate which comprises treating vapors thereof with added hydrochloric acid in the presence of an aqueous solution of a mercury salt comprising a chloride capable of being dissolved, without substantial decomposition, in the solvent of the solution.

3. A process for refining cracked distillate which comprises treating vapors thereof with added hydrochloric acid in the presence of an aqueous solution of a water soluble mercury salt.

4. A process for refining cracked distillate which comprises treating vapors thereof with added hydrochloric acid in the presence of a solid contact agent and an aqueous solution of a water soluble mercury salt.

5. A process for refining cracked distillate which comprises treating vapors thereof with added hydrochloric acid in the presence of an adsorbent earth and an aqueous solution of a water soluble mercury salt.

6. A process for refining hydrocarbon oil vapors which comprises treating the same with added hydrochloric acid in the presence of an aqueous solution of a water soluble mercury salt.

GUSTAV EGLOFF.
JACQUE C. MORRELL.